United States Patent Office 2,772,309
Patented Nov. 27, 1956

2,772,309
DITHIOOXAMIDES

Mona Phyllis Doerner, Walnut Creek, Calif., assignor to The Dow Chemical Company, Midland, Mich., a corporation of Delaware No Drawing. Application August 12, 1954,
Serial No. 449,497

3 Claims. (Cl. 260—551)

The present invention is concerned with dithiooxamides of the formula

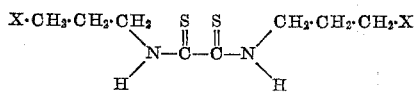

wherein X represents hydrogen or methyl. The new compounds are crystalline solids or viscous liquids which are somewhat soluble in many organic solvents and of very low solubility in water. The compounds are particularly useful as intermediates for the preparation of more complex organic derivatives and as active toxic constituents of compositions for the control of parasites such as mites, insects and fungi. The compounds are also valuable as active toxic constituents of compositions for altering the growth characteristics of plants, i. e. for controlling the growth of germinant seeds, emerging seedlings and many annual and perennial weeds and for promoting the maturation and defoliation of many crop plant species.

The novel dithiooxamide compounds may be prepared by mixing or otherwise blending n-butylamine or n-propylamine with dithiooxamide of the following formula

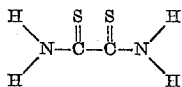

The contacting of the reactants conveniently may be carried out in an inert organic solvent such as methanol, ethanol or ether. Good results are obtained when employing at least two molecular proportions of n-alkylamine with each molecular proportion of the dithiooxamide. The reaction is somewhat exothermic and takes place smoothly at temperatures of from 0° to 40° C. The temperature may be controlled by regulating the rate of contacting the reactants and/or by the addition and subtraction of heat as required. Following the reaction the desired product may be separated by conventional methods, i. e. washing with water, filtration and decantation.

In a representative preparation, 20 moles of n-butylamine was dispersed in 1.8 liters of methanol and 10 moles of dithiooxamide added thereto with stirring and over a period of 30 minutes. The addition was carried out at a temperature of from 20° to 30° C. Stirring was thereafter continued and the reaction mixture maintained at this same temperature range for 1.25 hours to complete the reaction. During the reaction an N,N'-di-n-butyl dithiooxamide product precipitated in the reaction mixture as a crystalline solid. The latter was separated by filtration, washed with methanol and dried. The dried product was found to melt at 36°–38° C. and to have sulfur and nitrogen contents of 26.8 and 12.06 percent, respectively.

In a further operation, 72 grams (0.6 mole) of dithiooxamide was added portionwise with stirring and cooling to 100 grams (1.69 mole) of n-propylamine. The addition was carried out over a period of about 10 minutes and at a temperature of from 0° to 20° C. Stirring was thereafter continued for one hour at a temperature below 20° C. and the mixture then set aside for 16 hours at room temperature. Following the latter period, the reaction mixture was diluted with methanol, and the methanol solution warmed to boiling and thereafter cooled to —5° C. During the cooling an N,N'-di-n-propyl dithiooxamide product precipitated in the mixture as a crystalline solid and was separated by filtration. The latter was washed with methanol and found to melt at 15°–16.5° C. and have a nitrogen content of 13.39 percent and a sulfur content of 31.11 percent.

I claim:
1. A dithiooxamide having the formula

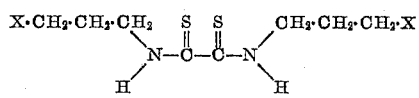

wherein X is a member of the group consisting of hydrogen and methyl.
2. N,N'-di-n-propyl dithiooxamide.
3. N,N'-di-n-butyl dithiooxamide.

References Cited in the file of this patent

UNITED STATES PATENTS

| | | |
|---|---|---|
| 2,484,257 | Watson et al. | Oct. 11, 1949 |
| 2,525,075 | Levesque | Oct. 10, 1950 |
| 2,531,283 | Levesque | Nov. 21, 1950 |
| 2,664,445 | Linch | Dec. 29, 1953 |

OTHER REFERENCES

Wallach: "Liebigs Annalen," vol. 262 (1891), pp. 354–362.